United States Patent
Lorey et al.

(10) Patent No.: US 12,157,406 B2
(45) Date of Patent: Dec. 3, 2024

(54) SUSPENSION DEVICE

(71) Applicant: GRAMMER Aktiengesellschaft, Ursensollen (DE)

(72) Inventors: Konstantin Lorey, Schmidgaden (DE); Konstantin Krivenkov, Amberg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 144 days.

(21) Appl. No.: 17/996,739

(22) PCT Filed: Apr. 16, 2021

(86) PCT No.: PCT/EP2021/059986
§ 371 (c)(1),
(2) Date: Oct. 20, 2022

(87) PCT Pub. No.: WO2021/213941
PCT Pub. Date: Oct. 28, 2021

(65) Prior Publication Data
US 2023/0219472 A1    Jul. 13, 2023

(30) Foreign Application Priority Data

Apr. 21, 2020 (DE) ............... 10 2020 110 786.2

(51) Int. Cl.
*B60N 2/50* (2006.01)
*B60N 2/52* (2006.01)
*B60N 2/54* (2006.01)

(52) U.S. Cl.
CPC ............. *B60N 2/502* (2013.01); *B60N 2/522* (2013.01); *B60N 2/544* (2013.01); *B60N 2205/30* (2013.01)

(58) Field of Classification Search
CPC ........ B60N 2/502; B60N 2/522; B60N 2/544; B60N 2205/30
See application file for complete search history.

(56) References Cited

U.S. PATENT DOCUMENTS 3,049,330 A * 8/1962 Coons ................. B60N 2/2352
                                                                                                  248/419
3,109,622 A * 11/1963 Heyl, Jr. ................. B60N 2/06
                                                                                                  248/420

(Continued)

FOREIGN PATENT DOCUMENTS

CN         107009930         8/2017
CN         107554367         1/2018

(Continued)

OTHER PUBLICATIONS

Official Action for German Patent Application No. 102020110786.2, dated Jan. 10, 2023, 6 pages.

(Continued)

*Primary Examiner* — Eret C McNichols
(74) *Attorney, Agent, or Firm* — Sheridan Ross P.C.

(57) ABSTRACT

The invention relates to a seat arrangement for a vehicle, in particular for a fork-lift truck, the seat arrangement having a first spring part, on which a vehicle seat is arranged, and a second spring part, which can be moved relative to the first spring part by means of a connecting unit and is connected to the body, the relative movement of the first spring part to the second spring part being sprung by means of a spring unit, the spring unit and the connecting unit being arranged laterally on the first spring part.

16 Claims, 12 Drawing Sheets

(56) References Cited

U.S. PATENT DOCUMENTS

| | | | | |
|---|---|---|---|---|
| 3,198,473 | A | * | 8/1965 | Holz ................. B60N 2/507 248/419 |
| 3,298,654 | A | * | 1/1967 | Dome ................. B60N 2/525 248/585 |
| 3,339,906 | A | * | 9/1967 | Bror ................. B60N 2/045 297/344.14 |
| 3,601,351 | A | * | 8/1971 | Ambrosius ........... B60N 2/525 248/585 |
| 4,047,759 | A | | 9/1977 | Koscinski |
| 4,520,986 | A | | 6/1985 | Liljequist et al. |
| 4,840,427 | A | * | 6/1989 | Hong ................. B60N 2/203 296/65.09 |
| 4,986,591 | A | * | 1/1991 | Martienssen ......... B60N 2/045 296/65.09 |
| 6,286,819 | B1 | * | 9/2001 | Ritchie ............. B60N 2/507 248/550 |
| 6,354,556 | B1 | * | 3/2002 | Ritchie ............. B60N 2/525 248/421 |
| 6,715,825 | B2 | * | 4/2004 | Tame ................. B60N 2/203 297/94 |
| 6,755,469 | B2 | * | 6/2004 | Akaike .............. B60N 2/1615 297/216.19 |
| 6,773,050 | B1 | * | 8/2004 | Hotary .............. B60N 2/3093 296/65.01 |
| 7,850,220 | B2 | * | 12/2010 | Holdampf ........... B60N 2/3075 296/65.09 |
| 10,112,512 | B2 | * | 10/2018 | Lorey ............... B60N 2/505 |
| 10,220,738 | B2 | * | 3/2019 | Lorey ............... B60N 2/544 |
| 10,328,826 | B2 | * | 6/2019 | Ramachandra ........ B60N 2/206 |
| 10,384,568 | B2 | * | 8/2019 | Lorey ............... B60N 2/1665 |
| 10,384,571 | B2 | * | 8/2019 | Lorey ............... B60N 2/02 |
| 11,919,427 | B2 | * | 3/2024 | Vetere, II .......... B60N 2/203 |

FOREIGN PATENT DOCUMENTS

| | | |
|---|---|---|
| CN | 108016326 | 5/2018 |
| DE | 1245766 | 7/1967 |
| DE | 2236253 | 2/1973 |
| DE | 2724298 | 1/1978 |
| DE | 2704921 | 8/1981 |
| DE | 102009031417 | 1/2011 |
| EP | 3263397 | 1/2018 |

OTHER PUBLICATIONS

Official Action (with English translation) for China Patent Application No. 2021800301647, dated Feb. 29, 2024, 9 pages.

Hearing Notice for India Patent Application No. 202227059978, dated Apr. 25, 2024, 3 pages.

Official Action for Indian Patent Application No. 202227059978, dated Dec. 14, 2022, 6 pages.

Official Action with machine translation for German Patent Application No. 102020110786.2, dated Nov. 24, 2020, 7 pages.

International Search Report and Written Opinion for International (PCT) Patent Application No. PCT/EP2021/059986, dated Jul. 26, 2021, 8 pages.

English Translation of the International Search Report for International (PCT) Patent Application No. PCT/EP2021/059986, dated Jul. 26, 2021, 2 pages.

* cited by examiner

SUSPENSION DEVICE

CROSS REFERENCE TO RELATED APPLICATIONS

This application is a national stage application under 35 U.S.C. 371 and claims the benefit of PCT Application No. PCT/EP2021/059986 having an international filing date of 16 Apr. 2021, which designated the United States, which PCT application claimed the benefit of German Patent Application No. 10 2020 110 786.2 filed 21 Apr. 2020, the disclosures of each of which are incorporated herein by reference in their entireties.

Field of the Invention

The invention relates to a seat arrangement for a vehicle, in particular for a fork-lift truck, the seat arrangement having a first spring part, on which a vehicle seat is arranged, and a second spring part, which can be moved relative to the first spring part by means of a connecting unit and is connected to the body, the relative movement of the first spring part with respect to the second spring part being sprung by means of a spring unit.

Background

Such suspension devices for vehicle seats are known from the prior art, wherein a suspension upper part, a suspension lower part and a connecting unit are arranged in such a way that the connecting unit, in particular in interaction with a suspension and/or damping, is arranged between the suspension upper part and the suspension lower part. For example, the connecting unit is a scissor-type frame or the like.

However, especially in the area of forklift trucks, the space for a seat arrangement is limited, especially in height, so that a seat arrangement as in the prior art is not suitable for the area of forklift trucks.

It is also not irrelevant for the suspension properties of the suspension devices whether a person with a low mass or a person with a high mass sits down on the vehicle seat.

SUMMARY

Accordingly, it is the object of the present invention to provide a seat arrangement which can be built more compactly in order to be better used in the field of forklift trucks.

This object is solved by a seat arrangement with the features of claim 1. Advantageous embodiments of the invention can be found in the dependent patent claims.

The main idea of the invention is to provide a seat arrangement for a vehicle, in particular for a fork-lift truck, the seat arrangement having a first spring part, on which a vehicle seat is arranged, and a second spring part, which can be moved relative to the first spring part by means of a connecting unit and is connected to the Body, the relative movement of the first spring part with respect to the second spring part being sprung by means of a spring unit, the spring unit and the connecting unit being arranged laterally on the first spring part.

The spring unit and the connecting unit are thus arranged laterally on the first spring part according to the invention, so that the overall installation space of the seat arrangement can be reduced. This can also be done particularly preferably by the interspace between the first spring part and the second spring part being free of the spring unit and the connecting unit when viewed in a height direction of the seat arrangement. This means that the interspace between the first spring part and the second spring part can be reduced due to missing components, so that in particular a distance between the first spring part and the second spring part can be reduced. The space required for the seat arrangement is reduced.

The same can also apply to a possible damping unit provided.

According to a particularly preferred embodiment, it is provided that the connecting unit comprises a first connecting sub-unit and a second connecting sub-unit, wherein preferably the first connecting sub-unit and the second connecting sub-unit are arranged spaced apart from each other in a width direction and the vehicle seat, viewed in the width direction, is arranged between the first connecting sub-unit and the second connecting sub-unit.

In other words, the connecting sub-units are arranged on the left and right of the vehicle seat so that the vehicle seat is enclosed by the connecting sub-units. This ensures particularly good guidance of the first spring part relative to the second spring part during a relative movement.

According to a further preferred embodiment, it is provided that the first connecting sub-unit and the second connecting sub-unit each have a first lever element and a second lever element, wherein the first lever element is connected rotatably about a first axis of rotation to the first spring part and rotatably about a second axis of rotation to the second spring part, and wherein the second lever element is connected rotatably about a third axis of rotation to the first spring part and rotatably about a fourth axis of rotation to the second spring part.

It may be provided that the first lever elements and the second lever elements are each identically formed, but this is not absolutely necessary.

According to a further embodiment, a first connecting line between the first axis of rotation and the second axis of rotation is parallel to a second connecting line between the third axis of rotation and the fourth axis of rotation, and a third connecting line between the first axis of rotation and the third axis of rotation is parallel to a fourth connecting line between the second axis of rotation and the fourth axis of rotation.

Such an arrangement accordingly presents a parallelogram arrangement of the connecting unit or connecting sub-units, whereby the vehicle seat does not undergo tilting or the like upon relative movement of the first spring part to the second spring part, so that a person on the vehicle seat can remain in position except for a height movement and a slight movement in longitudinal direction.

Further according to a preferred embodiment, the third axis of rotation is arranged in front of the first axis of rotation, the first axis of rotation is arranged in front of the fourth axis of rotation and the fourth axis of rotation is arranged in front of the second axis of rotation when viewed in a longitudinal direction, wherein the first axis of rotation and the second axis of rotation are arranged above the third axis of rotation and the fourth axis of rotation when viewed in a height direction.

This makes it possible to achieve a particularly flat design of the connecting unit or the connecting sub-units, in particular when a distance between the lever elements or the first and second connecting sub-units and the third and fourth axis of rotation is small, seen in the height direction. This can further save installation space and further optimise the seat arrangement.

Preferably, it is also possible to arrange the lever elements in such a way that in a non-deflected state of the first spring part, i.e. when there is no relative movement of the first spring part to the second spring part, the first connecting line to the second connecting line are arranged running only in longitudinal direction.

According to a further preferred embodiment, it is provided that a first distance between the first axis of rotation and the second axis of rotation corresponds to a second distance between the third axis of rotation and the fourth axis of rotation, and a third distance between the first axis of rotation and the third axis of rotation corresponds to a fourth distance between the second axis of rotation and the fourth axis of rotation.

According to a further preferred embodiment, the spring unit comprises a first tension spring having a first end and a second end and an adjustment device, the first end of the first tension spring being connected to the second spring part and the second end of the first tension spring being connected to the adjustment device, the adjustment device being rotatably connected about a fifth axis of rotation to the first lever element of the first connecting sub-unit, the adjustment device comprising an adjustment means by means of which a fifth distance between the second end of the first tension spring and the second axis of rotation is variable.

In particular, the fifth distance is always greater than zero, so that an effective first lever arm is defined, the effects of which are described in more detail below.

Such an arrangement generates torques which can be used to return the deflected first spring part to its initial position or home position or home position. The resulting torques are described in more detail below. By changing the fifth distance, the spring force or the extension force of the spring unit can also be changed.

Because the first tension spring is connected with its first end to the first lever element of the first connecting sub-unit at the fifth distance and with its second end to the upper spring part or the lower spring part, a first lever arm is formed for the first tension spring, the arrangement of which depends on whether the spring unit is connected by means of the second end to the upper spring part or the lower spring part.

In the following it is to be assumed that the second end is connected to the first spring part, unless otherwise stated. In the case of a connection of the second end with the lower spring part, the relationships arise accordingly.

Due to the fact that the arrangement of the first end of the first tension spring at the corresponding fifth distance with the first lever element of the first connecting sub-unit forms the first lever arm, which extends from the first end region of the spring unit to the second axis of rotation, the spring unit is braced when a force is applied from the outside, so that a force acts on the first lever arm through the spring unit, resulting in a torque which counteracts the direction of the external application of force.

The resulting force generates a torque via a theoretical lever arm in the second axis of rotation, whereby the theoretical lever arm extends from the second axis of rotation perpendicular to the first spring part.

Because the fifth distance is variable, the first tension spring arm is also variable, so that the torque can be adjusted by means of the first tension spring. If a light driver sits on the vehicle seat, the total torque can be selected to be smaller, so that the first lever arm can be shorter. However, if a heavy driver sits on the vehicle seat, more torque is required to reset the suspension device. The first lever arm should therefore be selected longer.

In particular, the lever arm can also be changed by adjusting the first distance, whereby the extension force or the spring rate of the first tension spring can be changed.

The first end and the second end of first tension spring, whereby particularly preferably the first and/or the second end of the tension spring have an eyelet or the like, so that the tension spring can be easily connected, in particular suspended, with openings or devices provided for this purpose.

By means of an adjustment of the fifth distance of first end of first tension spring and not by means of a change of the spring tension of the spring unit, the spring rate and the extension force of the spring unit, i.e. in particular of the tension spring, are changed.

An adjustment here is equivalent to a change in position of the spring unit or spring units in space. By changing the position of the spring unit or the spring of the spring unit, the length of the lever arm engaging the spring unit is changed.

In particular, this adjusts the first end relative to the suspension lower part, which is preferably rigidly connectable to a floor, a body or the like, or the suspension upper part. By adjusting or moving the first end of first tension spring, the length of the lever can be changed, so that the spring rate and the extension force of the suspension device can be changed. The first end thus correspondingly comprises the force application point of the first tension spring.

The extension force is changed, as already briefly indicated, due to the following relationship. As is known, a torque is proportional to the length of a lever when the applied force is constant. By adjusting the position of the first end, the length of the first lever arm is changed. If a relatively heavy driver sits on the vehicle seat which has the suspension device according to the invention, the lever must be correspondingly longer than for a light driver.

Since according to the invention the spring tension is not changed to change the extension force, but only the position of the spring unit is changed, only a small force is required from a user to change the extension force of the suspension device. This also enables a very quick adjustment of the extension force.

According to a further preferred embodiment, it is provided that the adjusting means is a rotating spindle which can be actuated mechanically or electrically. Preferably, when actuated, the rotating spindle is rotated about a fifth axis of rotation.

If the rotating spindle is actuated electrically, for example by means of an engine, in particular an electric motor, the rotating spindle also rotates about the fifth axis of rotation.

According to a further preferred embodiment, it is provided that the spring unit comprises a second tension spring having a first end and a second end, the first end of the second tension spring being connected to the second spring part and the second end of the second tension spring being connected to the first lever element or the second lever element of the second connecting sub-unit.

Particularly preferably, this is arranged at a sixth distance from the second axis of rotation, so that a certain minimum torque can also be provided by this. The explanations in this regard apply analogously to the first tension spring.

According to a further preferred embodiment, a first armrest is provided, which is arranged laterally on the vehicle seat, wherein the spring unit is arranged below the armrest as seen in a height direction.

This installation space below the armrest is particularly available for forklift trucks, as these require a relatively large armrest for operating the vehicle.

Further advantageous embodiments result from the subclaims.

BRIEF DESCRIPTION OF THE DRAWINGS

Further aims, advantages and usefulness of the present invention can be seen from the following from the description in connection with the drawing. Herein show.

DETAILED DESCRIPTION

In the figures, identical components are to be understood with the corresponding reference signs. For the sake of clarity, components may not be marked with a reference sign in some figures, but have been designated elsewhere.

Figure 1A:
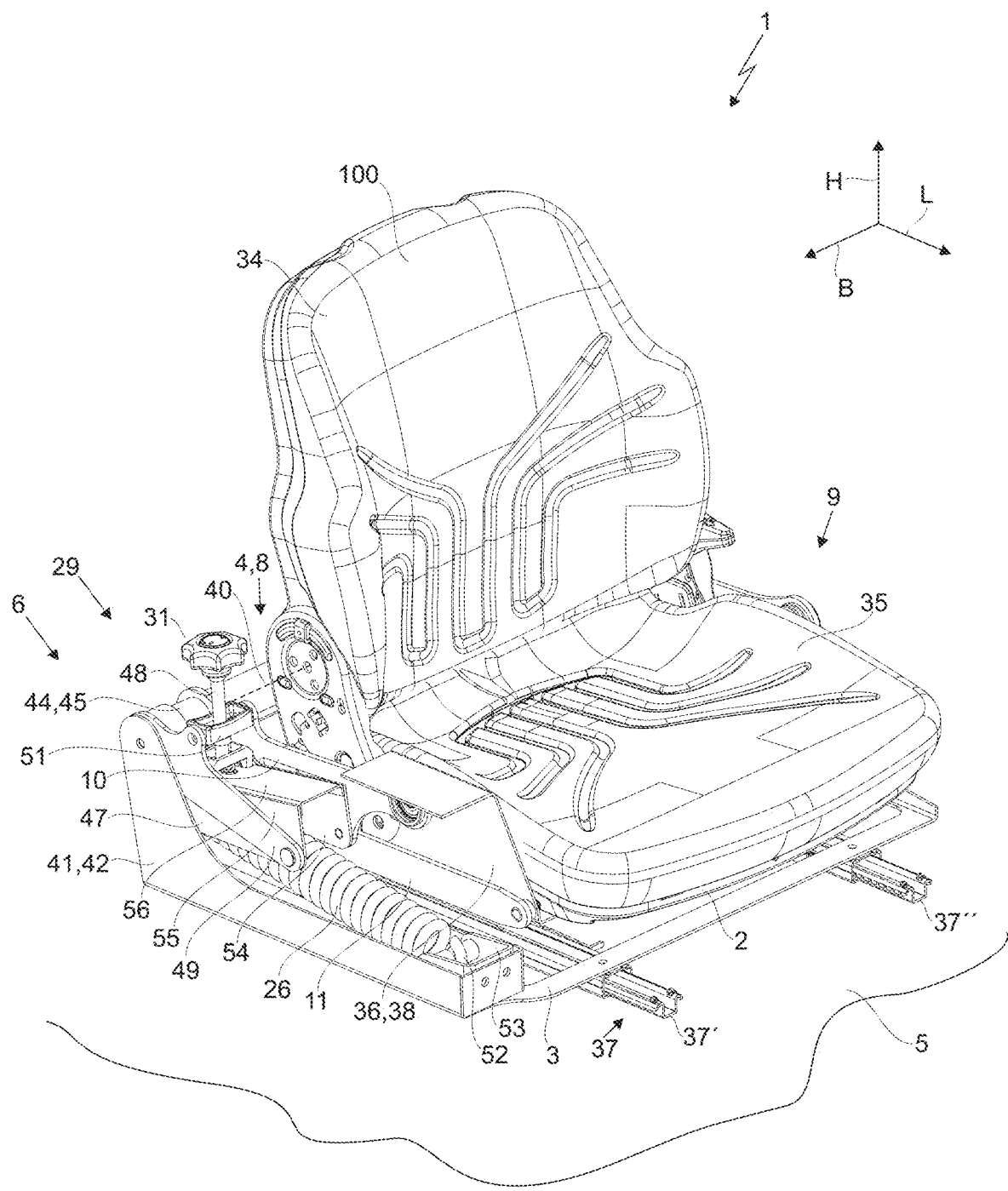
FIG. 1A Seat arrangement according to a preferred embodiment in a first perspective view.

FIG. 1A shows a seat arrangement 1 according to a preferred embodiment in a first perspective view, wherein the seat arrangement 1 has a first spring part 2, on which a vehicle seat 100 is arranged, and a second spring part 3, which is connected to a Body 5 and can be moved relative to the first spring part 2 by means of a connecting unit 4, wherein the relative movement of the first spring part 2 to the second spring part 3 is sprung by means of a spring unit 6, wherein the spring unit 6 and the connecting unit 4 are arranged laterally on the first spring part 2.

The vehicle seat 100 comprises a backrest 34 and a seat part 35, the backrest 34 being pivotably connected to the seat part 35 about a first swivel axis 40. The seat part 35 is arranged on top of at least a portion of the first spring part 2, as seen in a height direction H.

The connecting unit 4 comprises a first connecting sub-unit 8 and a second connecting sub-unit 9, the design of which will be discussed in more detail below. The vehicle seat 100 is arranged between the first connecting sub-unit 8 and the second connecting sub-unit 9, as seen in the width direction B. Preferably, the first connecting sub-unit 8 is arranged between the vehicle seat 100 and the spring unit 6, the spring unit 6 being further away from the vehicle seat 100 in the width direction B than the first connecting sub-unit 8.

A first fastening unit 38 and a second fastening unit 39 are provided on the first spring part 2, wherein the first connecting unit 8 can be connected to the first spring part 2 by means of the first fastening unit 38 and the second connecting unit 9 can be connected to the first spring part 2 by means of the second fastening unit 39. The first fastening unit 38 is designed and provided as an armrest support 36, that is, a first armrest 33 can be fastened on the armrest support 36.

The spring unit 6 preferably comprises a first tension spring 26 and an adjustment device 29, the design of which will be discussed below.

Furthermore, the seat arrangement 1 has a longitudinal adjustment 37 by means of which the seat arrangement 1 can be displaced in longitudinal direction relative to a Body 5. Preferably, the longitudinal adjustment 37 comprises a first longitudinal rail 37' and a second longitudinal rail 37".

The second spring element 3 comprises a spring part frame 41 which serves for the connection of the spring unit 6 and the connecting unit 4. The spring part frame 41 preferably has a first spring part frame element 42 and a second spring part frame element 43, wherein the first spring part frame element 42 serves for connection to the spring unit 6 and the first connecting sub-unit 8, wherein the second spring part frame element 43 serves for connection to the second connecting sub-unit 9.

Furthermore, a first connecting element 45, preferably a connecting tube 44, and a second connecting element 46 are provided, by means of which the first spring part frame element 42 and the second spring part frame element 43 are connected to one another. In this case, the first connecting element 45 is arranged behind the second connecting element 46, viewed in longitudinal direction L. In particular, the first connecting element is designed in such a way that a second axis of rotation 15 is formed, as described in more detail below. Further preferably, the connecting elements 45, 46 extend in width direction B and are connected to the first spring part frame element 42 and the second spring part frame element 43, wherein the spring part frame elements 42, 43 are rigidly connected to the second connecting element 46.

Further preferably, the second axis of rotation 15 is arranged behind the first swivel axis 40 and behind the vehicle seat 100 as seen in longitudinal direction L, whereby a further reduction in installation space can be made.

The spring unit 6 is arranged on the right side of the vehicle seat 100 as shown in FIG. 1A, for a person sitting on the vehicle seat 100.

Figure 1B:
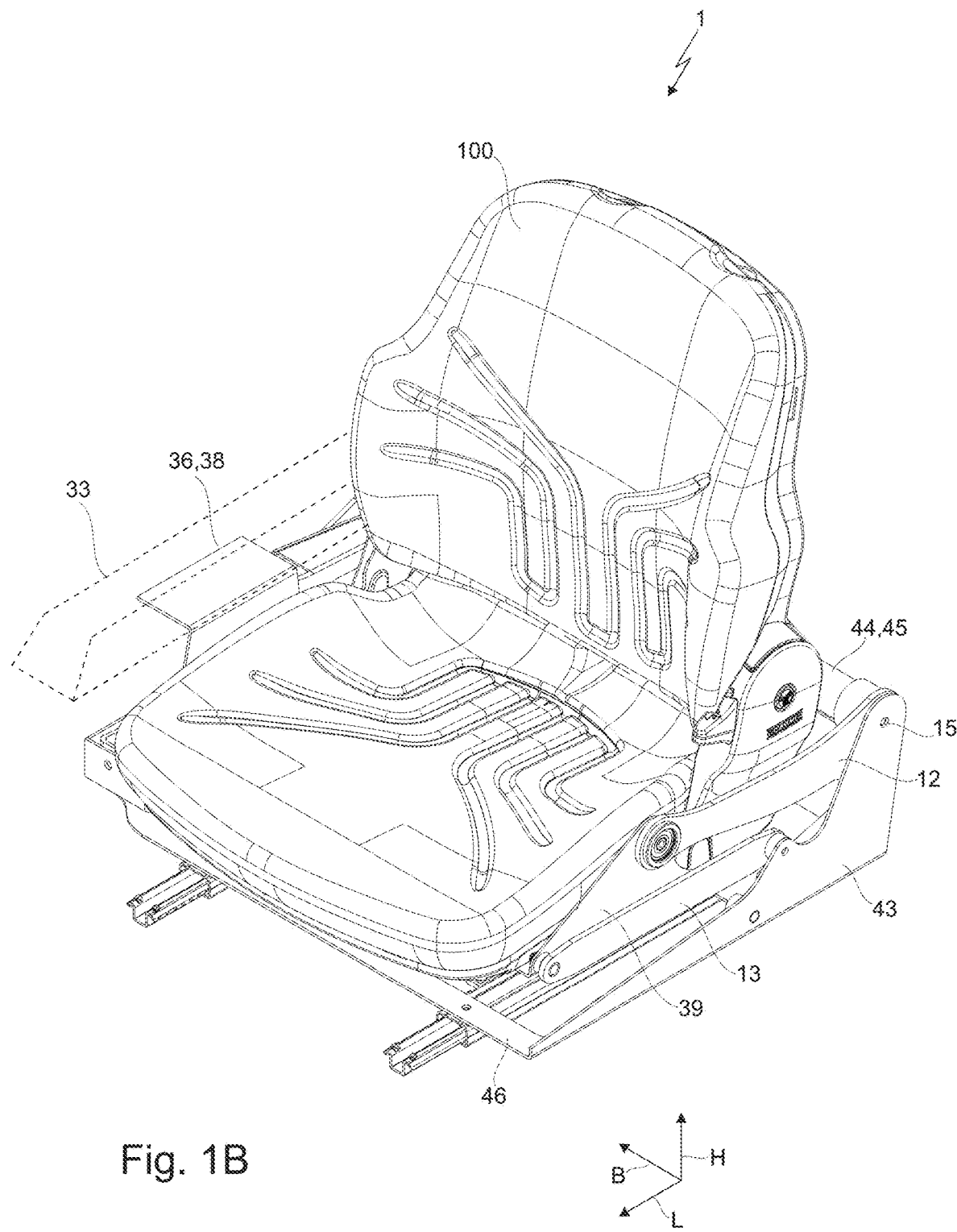
FIG. 1B Seat arrangement according to FIG. 1A in a second perspective view.

FIG. 1B shows the seat arrangement 1 according to FIG. 1A in a second perspective view.

The first connecting sub-unit 8 comprises a first lever element 10 and a second lever element 11 and the second connecting sub-unit 9 also comprises a first lever element 12 and a second lever element 13.

Figure 2A:
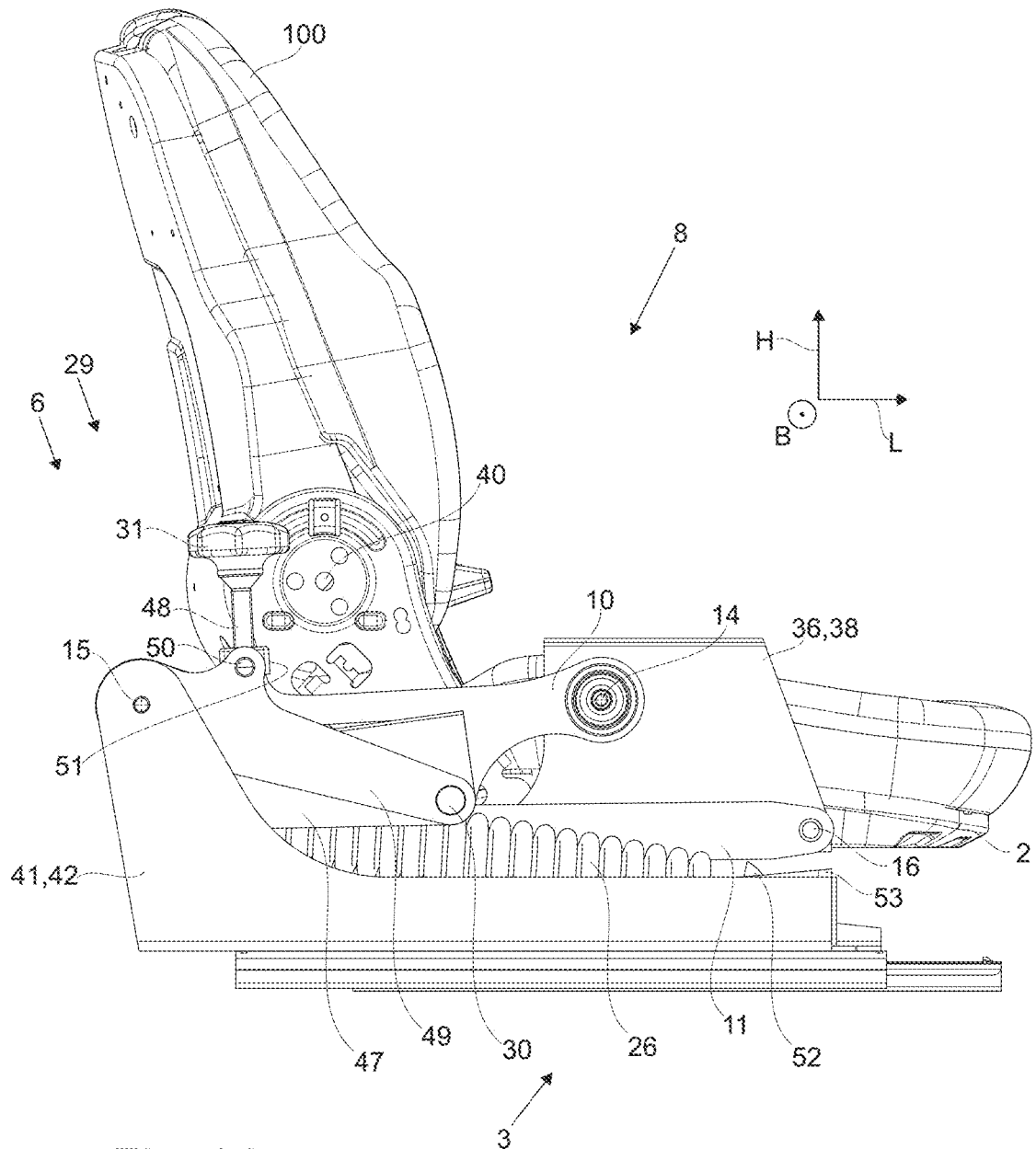
FIG. 2A Seat arrangement according to FIG. 1A in a first side view.
Figure 2B:
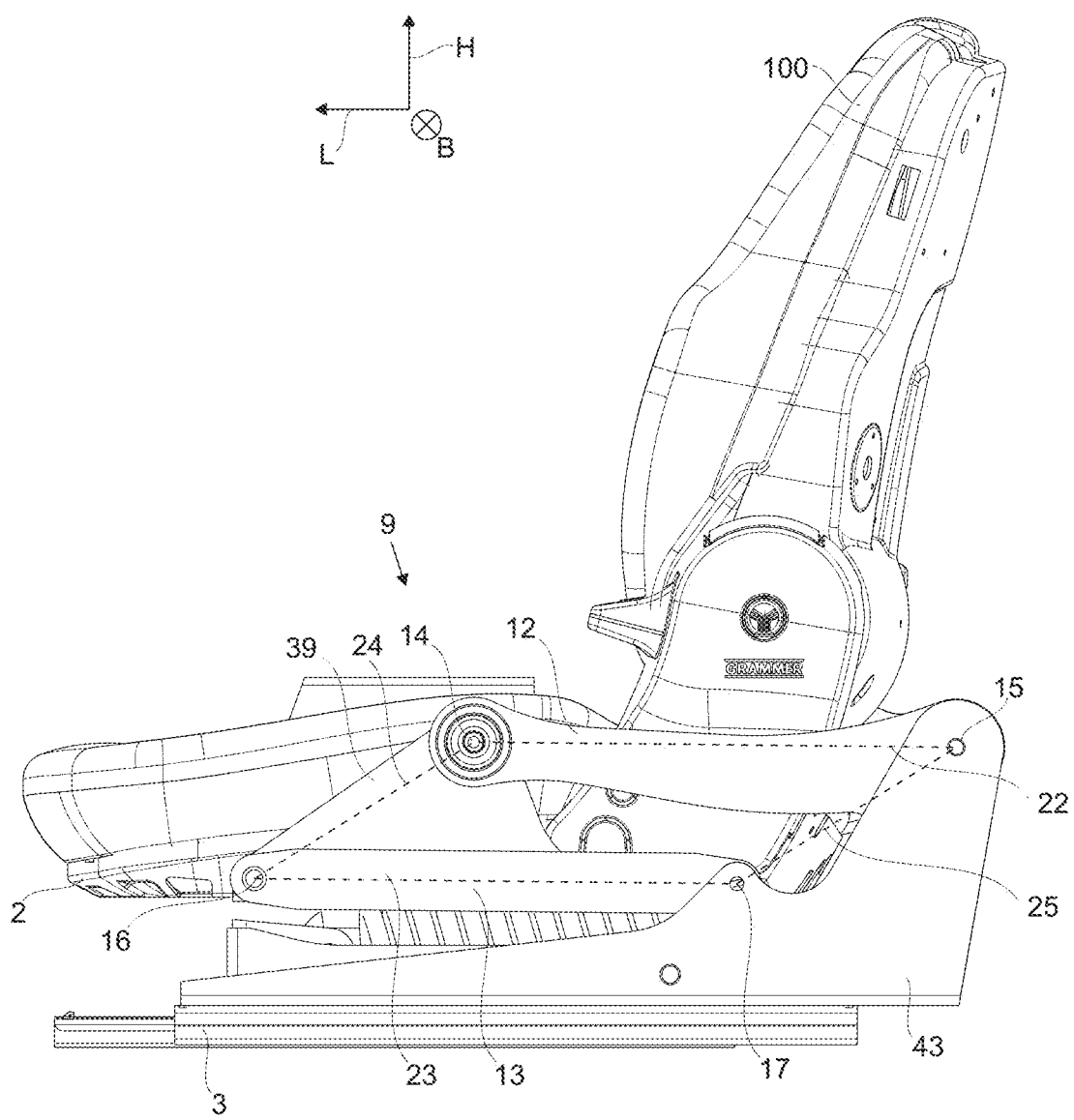
FIG. 2B Seat arrangement according to FIG. 1A in a second side view.
Figure 2C:
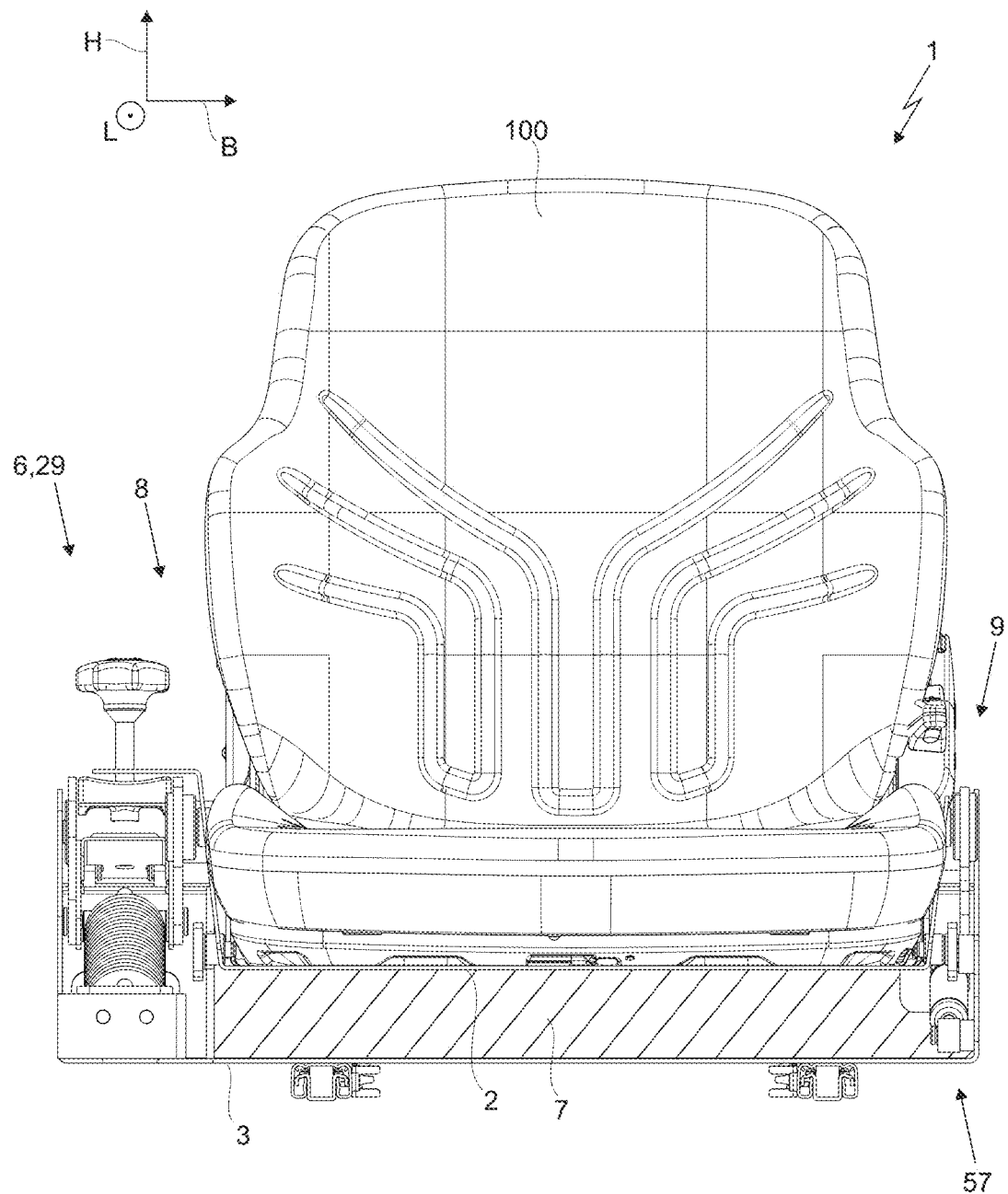
FIG. 2C Seat arrangement according to FIG. 1A in a front view.

FIGS. 2A, 2B and 2C show the seat arrangement 1 in side views and in a front view, respectively.

FIG. 2A shows the seat arrangement 1 in a first side view. The first connecting sub-unit 8 and the adjustment device 29 can be seen. The same applies to FIGS. 2B and 2C with the second connecting sub-unit 9.

The first connecting sub-unit 8 comprises a first lever element 10 and a second lever element 11, the first lever element 10 being connected rotatably about a first axis of rotation 14 to the first spring part 2 and rotatably about the second axis of rotation 15 to the second spring part 3, in particular to the first spring part frame element 42. The second lever element 11 is connected about a third axis of rotation 16 to the first spring part 2 and rotatably about a fourth axis of rotation 17 to the second spring part 3, in particular the first spring part frame element 42.

The same applies in an analogous manner to the second connecting sub-unit 9 with a first lever element of the first connecting sub-unit 12 and a second lever element of the second connecting sub-unit 13. This can be seen particularly well in FIG. 2B.

The spring unit 6 comprises a first tension spring 26 with a first end 27 and a second end 28, the first end 27 of the first tension spring 26 being connected to the second spring part 3 and the second end 28 of the first tension spring 26 being connected to the adjusting device 29, the adjusting device 29 being connected to the first lever element 10 of the first connecting sub-unit 8 so as to be rotatable about a fifth axis of rotation 30, the adjusting device 29 comprising an adjusting means 31 by means of which a fifth distance 32 between the second end 28 of the first tension spring 26 and the second axis of rotation 15 is variable.

Preferably, the first end 27 and the second end 28 are formed as eyelets 52, and the first end 27 is connected to the second spring part 3 by means of an eyelet holder 53. The eyelet holder 53 is rigidly connected to the second spring part 3.

Further, the adjustment device 29 comprises a third lever element 49 and a suspension means 47.

The suspension means 47 is rotatably connected to the first lever element 10 by means of the fifth axis of rotation 30, wherein the second end 28 of first tension spring 26 is connected to the suspension means 47. Further, the suspension means 47 is rotatably connected to the third lever element 49, wherein the third lever element 49 is further rotatably connected to the first spring frame element 42 about the second axis of rotation 15.

The suspension means 47 is thereby preferably U-shaped when viewed in the longitudinal direction L, wherein a first leg 54 and a second leg 55 are provided, wherein the legs 54, 55 are arranged below the connection 56 of the legs 54, 55. That is, the suspension means 47 is an inverted U.

The suspension means 47 is preferably arranged between the third lever element 49 and the first lever element 10, seen in width direction B.

Further with the third lever element 49 and the first lever element 10, an adjusting means guide 51 is provided rotatable about a sixth axis of rotation 50. The adjusting means 31 with preferably a rotating spindle 48 is thereby displaceable relative to the adjusting means guide 51, so that a rotation of the suspension means 47 about the fifth axis of rotation 30 can be carried out, whereby the second end 28 of first tension spring 26 can be displaced relative to the second axis of rotation 15 in order to change the length of the theoretical lever.

FIG. 2B shows the seat arrangement 1 in a second side view, so that the second connecting sub-unit 9 is clearly visible. The explanations to FIG. 2A apply in an analogous manner with regard to the connecting sub-units 8, 9.

FIG. 2C shows the seat arrangement 1 in a front view. It can be seen that an interspace 7 between the first spring part 2 and the second spring part 3 is free of elements such as suspension, damping or connection, so that a reduction of this space is possible, whereby the seat arrangement 1 can be built more compactly.

Preferably, a damping unit 57 is also provided to dampen relative movements of the first spring part 2 with respect to the second spring part 3. Preferably, the damping unit 57 is also arranged laterally.

Figure 3A:
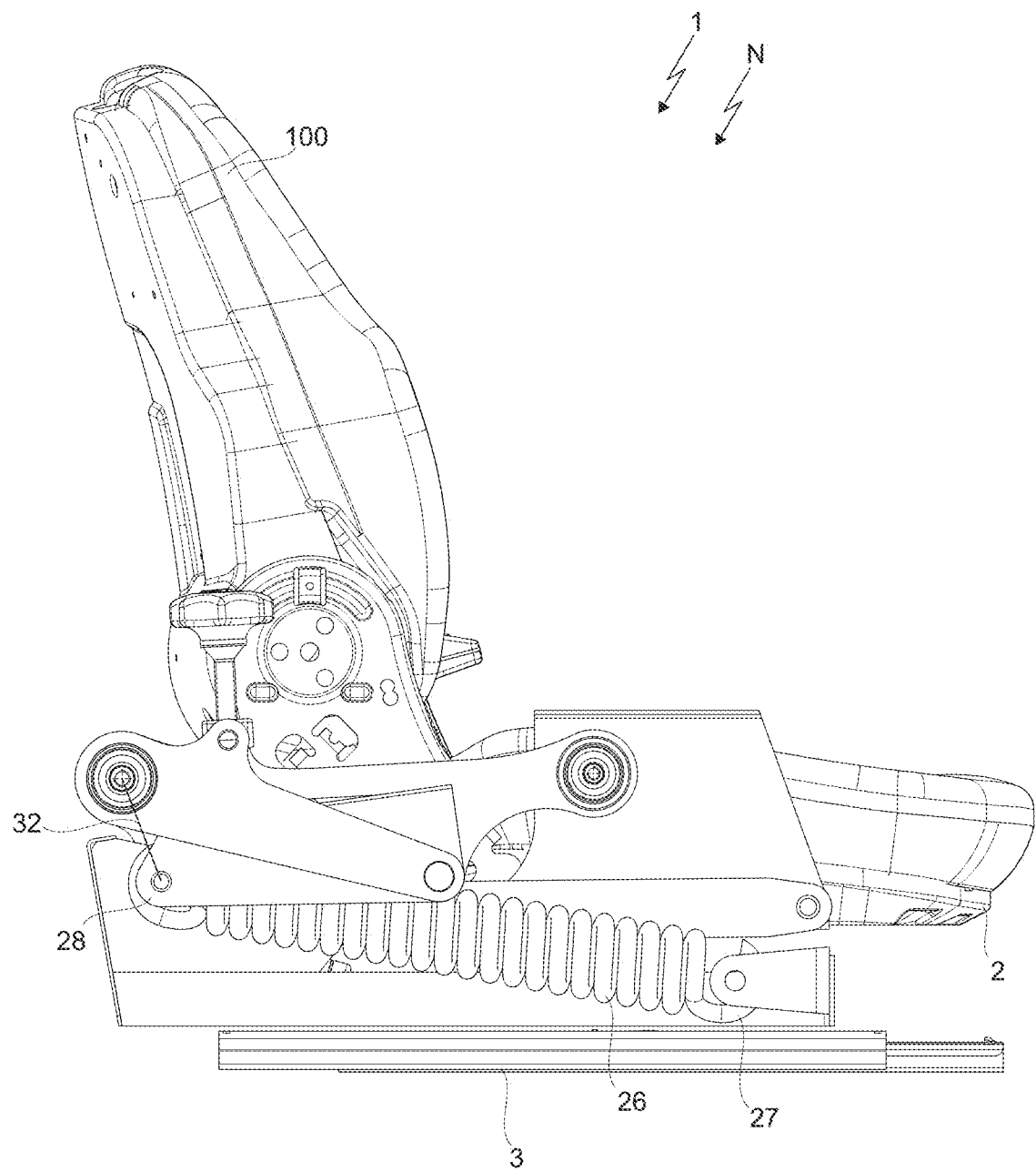
FIG. 3A Seat arrangement according to FIG. 1A in a sectional view in a non-deflected state.
Figure 3B:
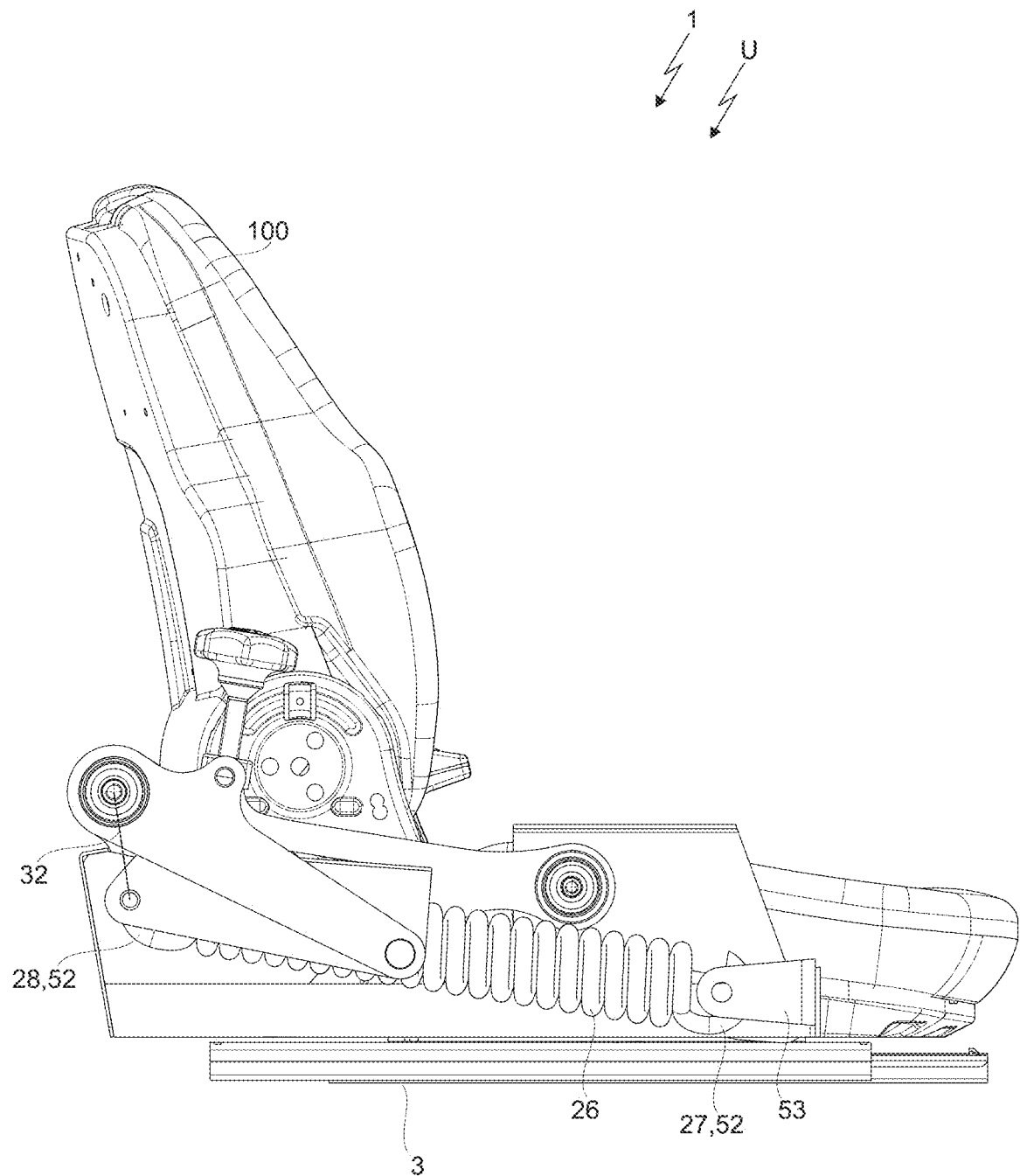
FIG. 3B Seat arrangement according to FIG. 1A in a sectional view in a downward deflected state.
Figure 3C:
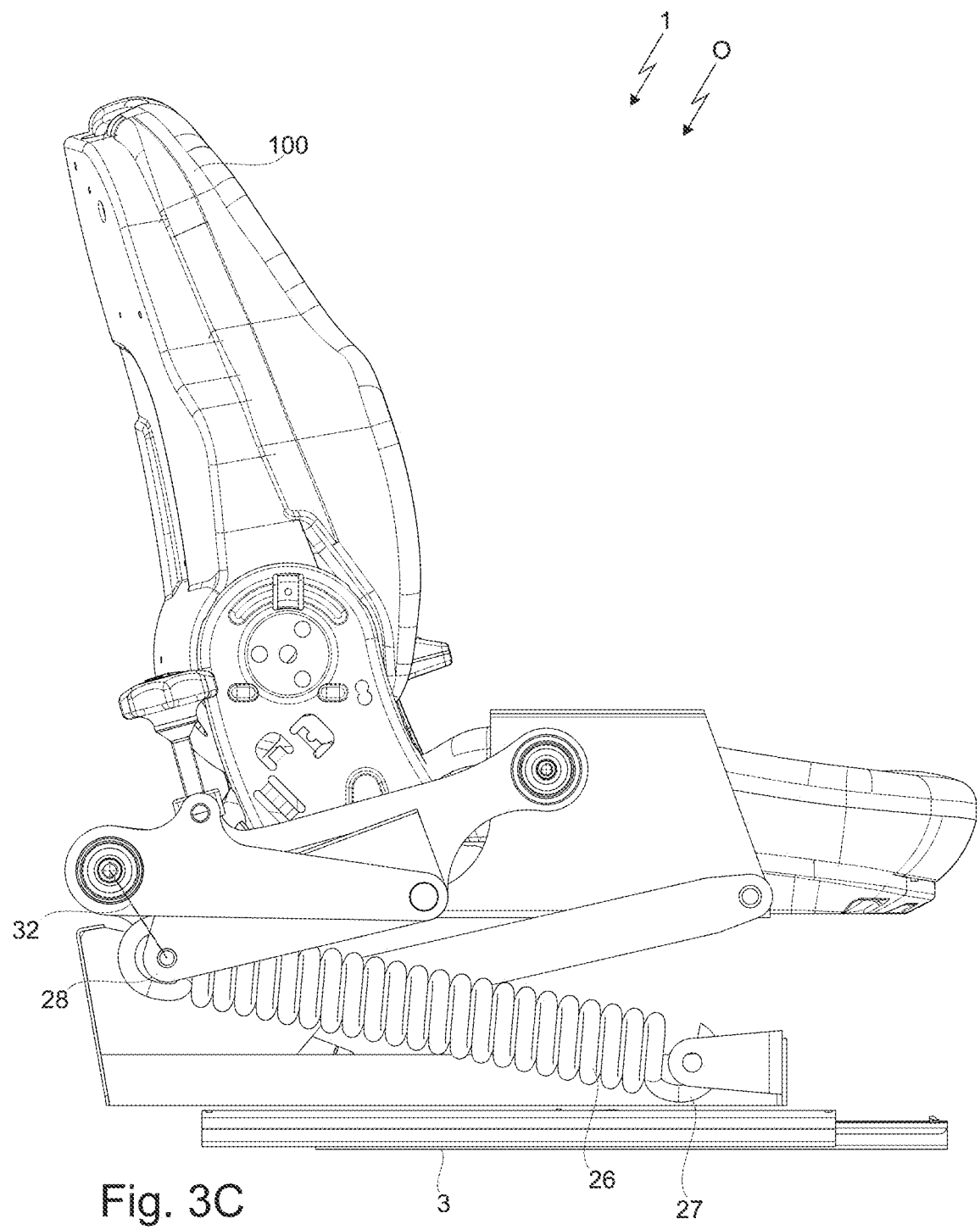
FIG. 3C Seat arrangement according to FIG. 1A in a sectional view in an upward deflected state.

FIGS. 3A, 3B and 3C show the seat arrangement in different states. In FIG. 3A the seat arrangement 1 is shown in a non-deflected state N, in FIG. 3B in a downward deflected state U and in FIG. 3C in an upward deflected state O.

During a relative movement of the first spring part 2 with respect to the second spring part 3, the corresponding components are moved according to their rotatable connections, whereby the fifth distance 32 is not changed during the relative movement. Only a distance of the first end 27 to the second end 28 of the first tension spring 26 is changed, which is accompanied by a springing of the relative movement.

Figure 4A:
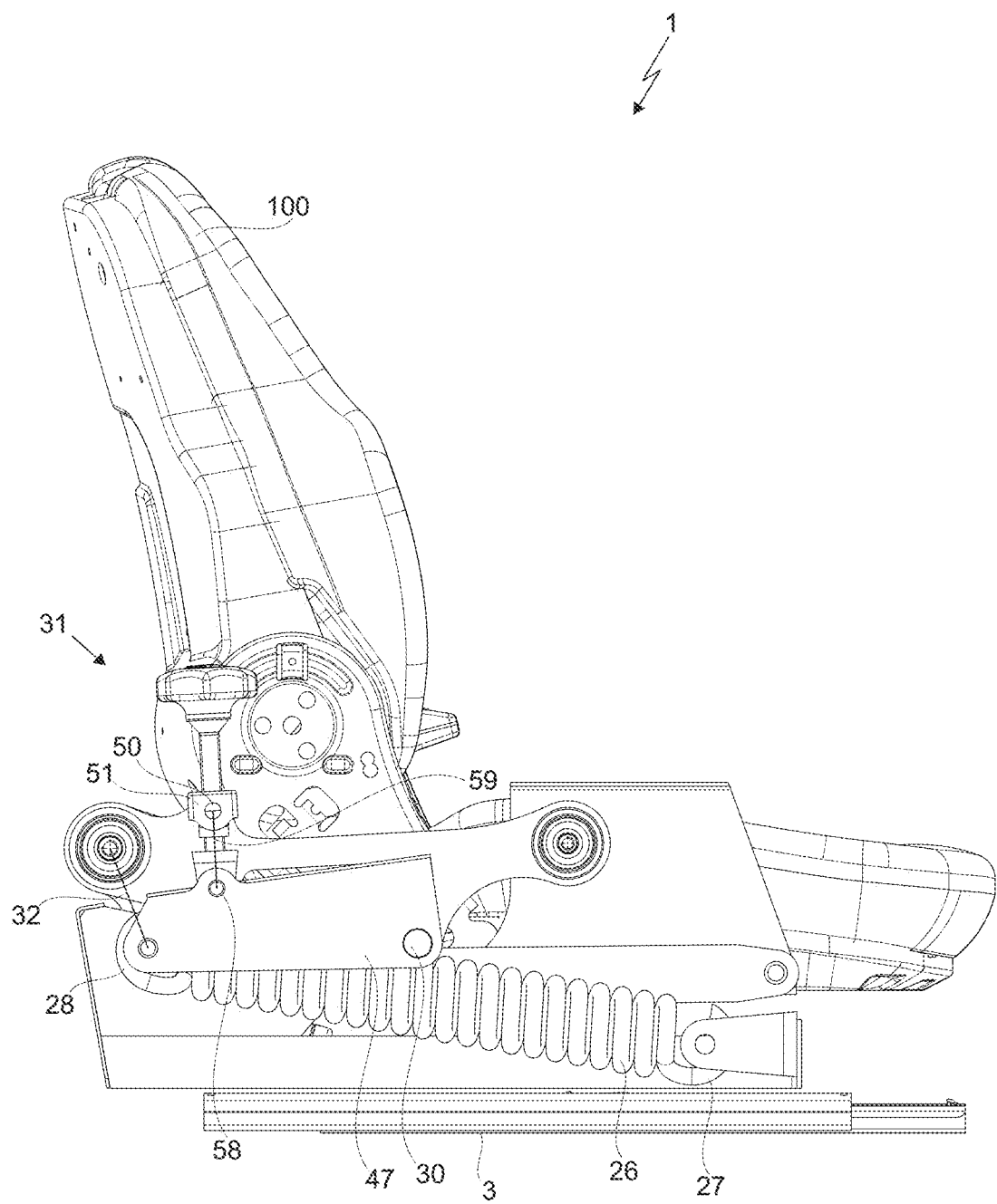
FIG. 4A Seat arrangement as in FIG. 1A in a first weight setting.
Figure 4B:
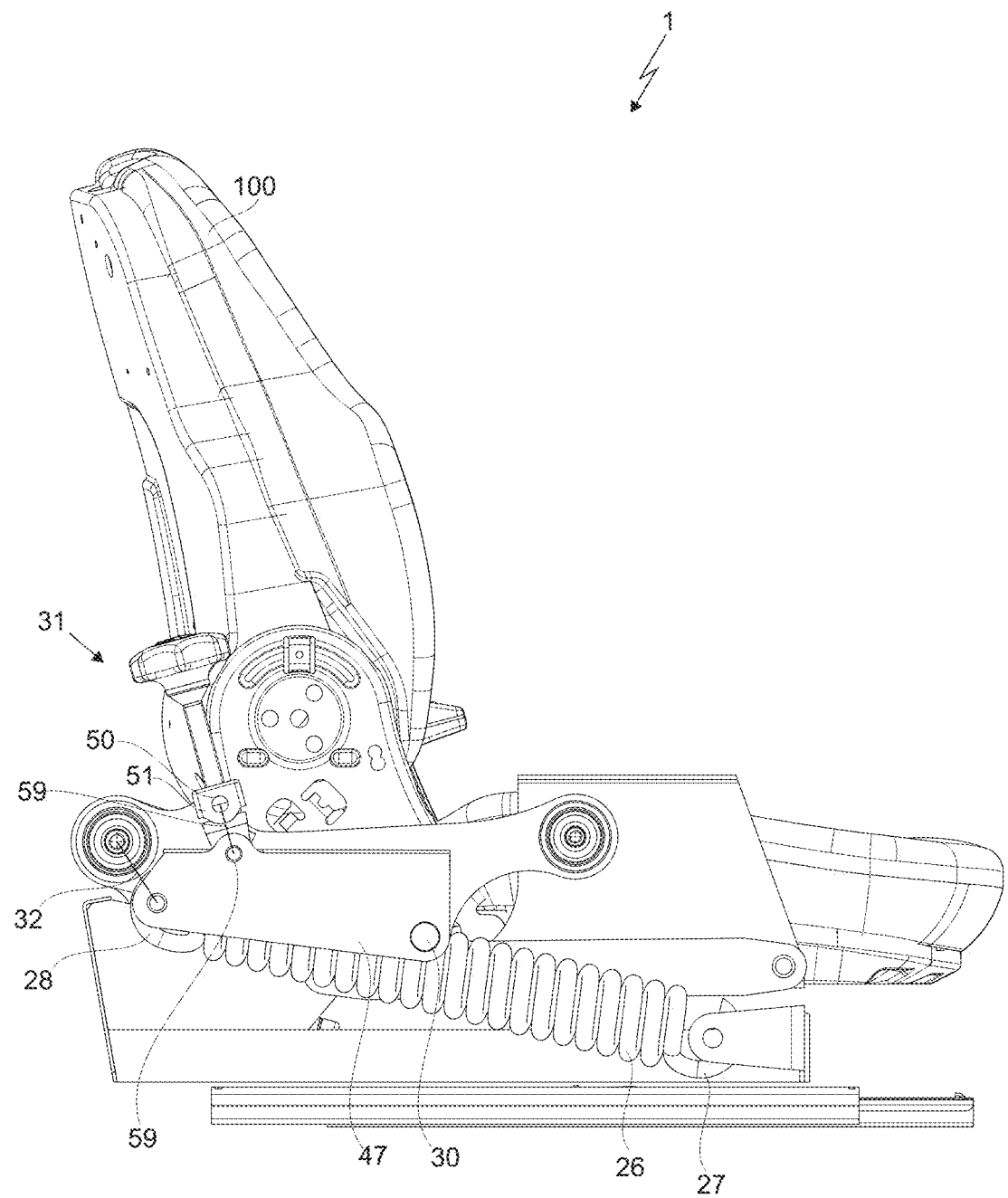
FIG. 4B Seat arrangement as in FIG. 1A in a second weight setting.
Figure 4C:
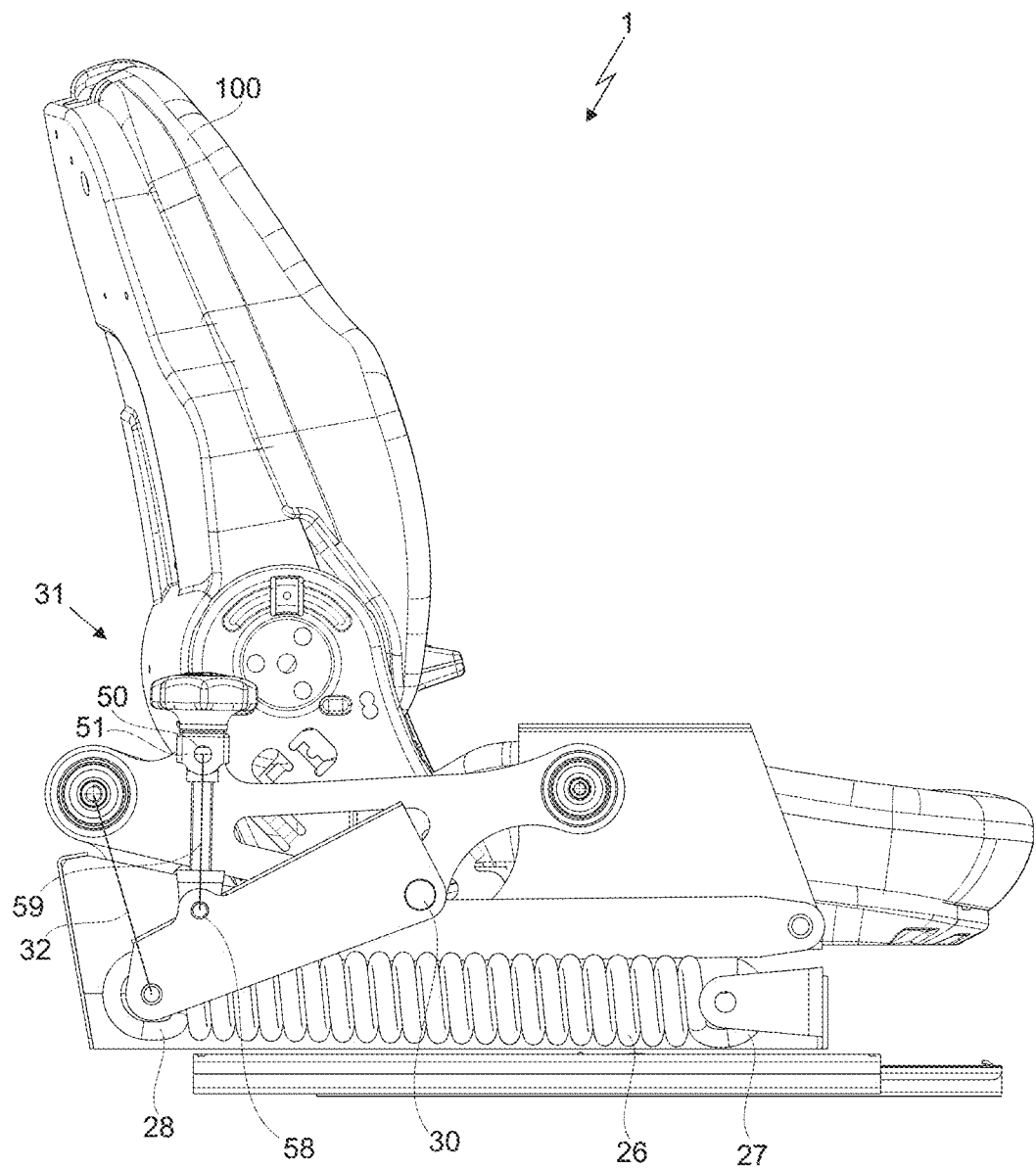
FIG. 4C Seat arrangement as in FIG. 1A in a third weight setting.

FIGS. 4A, 4B and 4C show the adjustment of the second end 28 of the first tension spring 26, which is accompanied by a change in the distance 32. This corresponds to a weight adjustment. The longer the distance 32, the heavier a person sitting on the seat arrangement 1 can be.

The rotating spindle 48 is mounted opposite the adjusting means guide 51 and is connected to the suspension means 47 so that it can rotate about a seventh axis of rotation 58. By means of an actuation of the adjusting means 31, the rotating spindle 48 is displaced relative to the adjusting means guide 51, so that this causes a rotation of the suspension means 47 about the fifth axis of rotation 30, so that the second end 28 of first tension spring 26 is displaced accordingly. This allows the distance 32 to be changed.

FIG. 4A shows the situation for a normal weight driver. FIG. 4B shows the situation for a light driver and FIG. 4C the situation for a heavy driver. A sixth distance 59 between the sixth axis of rotation 50 and the seventh axis of rotation 57 is decisive for the fifth distance 32. The longer the sixth distance 59, the longer the fifth distance 32.

Figure 5:
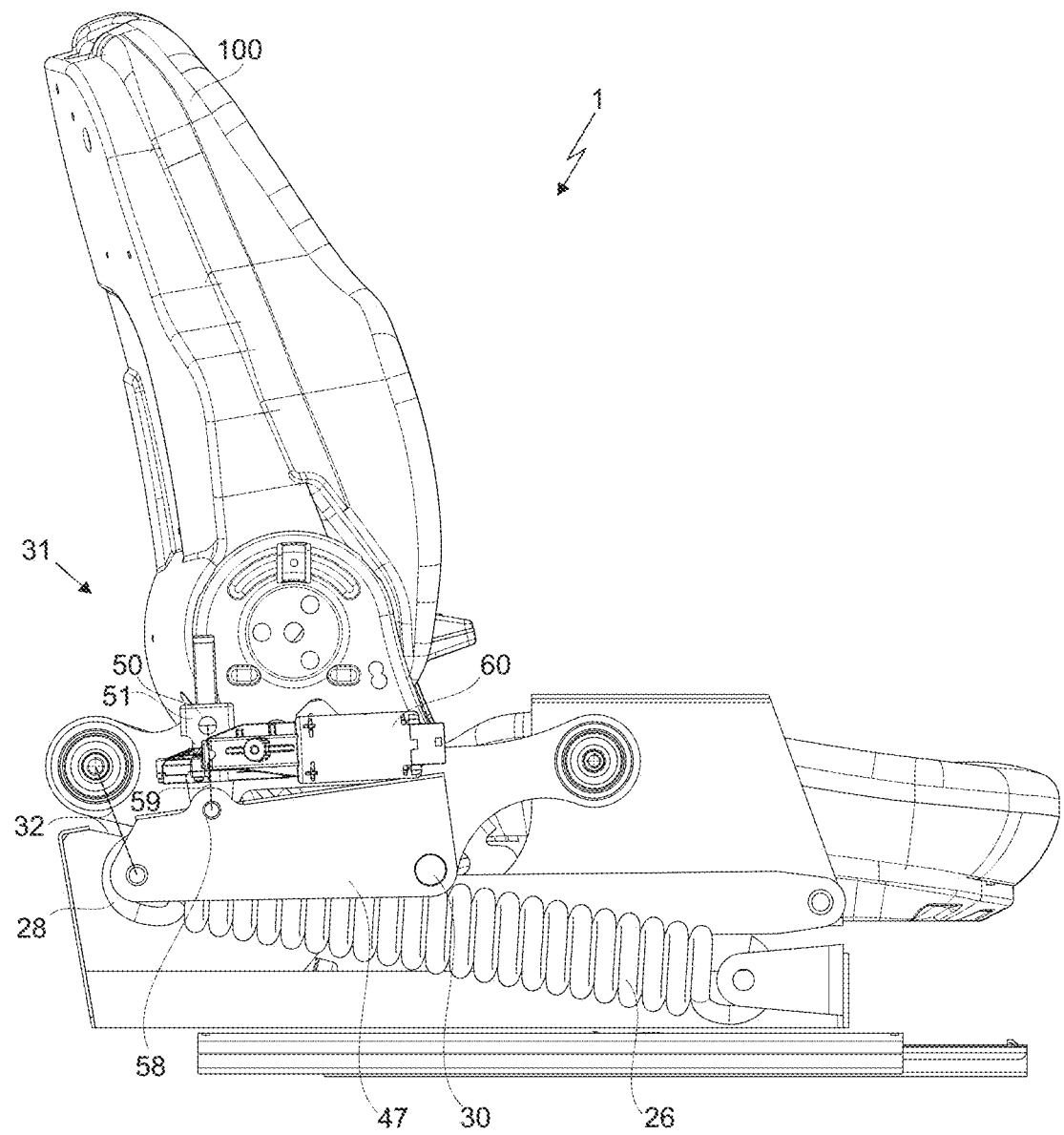
FIG. 5 Seat arrangement according to FIG. 1A with an alternative actuation option.

FIG. 5 further shows an alternative embodiment to the manual and mechanical displacement or actuation of the adjusting means 31. Here, the adjusting means 31 is actuated by means of a motor 60, in particular an electric motor, whereby the rotating spindle 48 can be displaced relative to the adjusting means guide 51 by means of the motor 60.

All features disclosed in the application documents are claimed to be essential to the invention insofar as they are new, individually or in combination, compared to the prior art.

LIST OF REFERENCE SIGNS

1 Seat arrangement
2 first spring part
3 second spring part
4 connecting unit
5 Body
6 Spring unit
7 interspace
8 first connecting sub-unit
9 second connecting sub-unit
10 first lever element of the first connecting sub-unit
11 second lever element of the first connecting sub-unit
12 first lever element of the second connecting sub-unit
13 second lever element of the second connecting sub-unit
14 first axis of rotation
15 second axis of rotation
16 third axis of rotation
17 fourth axis of rotation
22 first connecting line
23 second connecting line
24 third connecting line
25 fourth connecting line
26 first tension spring 27 first end of first tension spring
28 second end of first tension spring
29 adjustment device
30 fifth axis of rotation
31 adjusting means
32 fifth distance
33 first armrest
34 backrest
35 seat part
36 Armrest support
37 longitudinal adjustment
37' first longitudinal rail
37" second longitudinal rail
38 first fastening unit
39 second fastening unit
40 first swivel axis
41 spring part frame
42 first spring part frame element
43 second spring part frame element
44 connecting tube
45 first connecting element
46 second connecting element
47 Suspension means
48 rotating spindle
49 third lever element
50 sixth axis of rotation
51 Adjusting means guide
52 eyelet
53 eyelet holder
54 first leg
55 second leg
56 Connection
57 damping unit
58 seventh axis of rotation
59 sixth distance
60 engine
100 Vehicle seat
N non-deflected state
O upward deflected state
U downward deflected state
H Height direction
L longitudinal direction
B Width direction

What is claimed is:

1. A seat arrangement for a vehicle, in particular for a fork-lift truck, the seat arrangement comprising: a first spring part, on which a vehicle seat is arranged, and a second spring part, which can be moved relative to the first spring part by means of a connecting unit and is connected to bodywork, relative movement of the first spring part with respect to the second spring part being sprung by means of a spring unit,
wherein
the spring unit and the connecting unit are arranged laterally on the first spring part, the connecting unit comprising a first connecting sub-unit and a second connecting sub-unit, the first connecting sub-unit and the second connecting sub-unit each having a first lever element and a second lever element, the first lever element being connected rotatably about a first axis of rotation to the first spring part and rotatably about a second axis of rotation to the second spring part, and the second lever element being connected rotatably about a third axis of rotation to the first spring part and rotatably about a fourth axis of rotation to the second spring part, wherein, viewed in a longitudinal direction, the third axis of rotation is arranged in front of the first axis of rotation, the first axis of rotation is arranged in front of the fourth axis of rotation and the fourth axis of rotation is arranged in front of the second axis of rotation, wherein the spring unit comprises a first tension spring having a first end and a second end and an adjustment device, the first end of first tension spring being connected to the second spring part and the second end of first tension spring being connected to the adjustment device, the adjustment device being connected to the first lever element of the first connecting sub-unit so as to be rotatable about a fifth axis of rotation, the adjustment device comprising an adjusting means by which a fifth distance between the second end of the first tension spring and the second axis of rotation is variable.

2. The seat arrangement according to claim 1, wherein viewed in a height direction of the seat arrangement, an interspace between the first spring part and the second spring part is free of the spring unit and the connecting unit.

3. The seat arrangement according to claim 1, wherein
the first connecting sub-unit and the second connecting sub-unit are arranged at a distance from each other in a width direction and the vehicle seat, viewed in the width direction, is arranged between the first connecting sub-unit and the second connecting sub-unit.

4. The seat arrangement according to claim 1, wherein
seen in a height direction, the first axis of rotation and the second axis of rotation are arranged above the third axis of rotation and the fourth axis of rotation.

5. The seat arrangement according to claim 1, wherein
a first distance between the first axis of rotation and the second axis of rotation corresponds to a second distance between the third axis of rotation and the fourth axis of rotation, and a third distance between the first axis of rotation and the third axis of rotation corresponds to a fourth distance between the second axis of rotation and the fourth axis of rotation.

6. The seat arrangement according to claim 1, wherein
a first connecting line between the first axis of rotation and the second axis of rotation is parallel to a second connecting line between the third axis of rotation and the fourth axis of rotation, and a third connecting line between the first axis of rotation and the third axis of rotation is parallel to a fourth connecting line between the second axis of rotation and the fourth axis of rotation.

7. The seat arrangement according to claim 1, wherein
the adjusting means is a rotating spindle which is mechanically or electrically operable.

8. The seat arrangement according to claim 1, wherein
the spring unit is a second tension spring having a first end and a second end, the first end of the second tension spring being connected to the second spring part and the second end of the second tension spring being connected to the first lever element or the second lever element of the second connecting sub-unit.

9. The seat arrangement according to claim 1, wherein a first armrest is provided, which is arranged laterally on the vehicle seat, the spring unit being arranged below the armrest as seen in a height direction.

10. A seat arrangement for a vehicle, in particular for a fork-lift truck, the seat arrangement comprising a first spring part, on which a vehicle seat is arranged, and a second spring part, which can be moved relative to the first spring part by means of a connecting unit and is connected to bodywork, relative movement of the first spring part with respect to the second spring part being sprung by means of a spring unit, wherein the spring unit and the connecting unit are arranged laterally on the first spring part, the connecting unit comprising a first connecting sub-unit and a second connecting sub-unit, the first connecting sub-unit and the second connecting sub-unit each having a first lever element and a second lever element, the first lever element being connected rotatably about a first axis of rotation to the first spring part and rotatably about a second axis of rotation to the second spring part, and the second lever element being connected rotatably about a third axis of rotation to the first spring part and rotatably about a fourth axis of rotation to the second spring part, wherein, viewed in a longitudinal direction, the third axis of rotation is arranged in front of the first axis of rotation, the first axis of rotation is arranged in front of the fourth axis of rotation and the fourth axis of rotation is arranged in front of the second axis of rotation, wherein the spring unit comprises a second tension spring having a first end and a second end, the first end of the second tension spring being connected to the second spring part and the second end of the second tension spring being connected to the first lever element or the second lever element of the second connecting sub-unit.

11. The seat arrangement according to claim 10, wherein viewed in a height direction of the seat arrangement, an interspace between the first spring part and the second spring part is free of the spring unit and the connecting unit.

12. The seat arrangement according to claim 10, wherein the first connecting sub-unit and the second connecting sub-unit are arranged at a distance from each other in a width direction and the vehicle seat, viewed in the width direction, is arranged between the first connecting sub-unit and the second connecting sub-unit.

13. The seat arrangement according to claim 10, seen in a height direction, the first axis of rotation and the second axis of rotation are arranged above the third axis of rotation and the fourth axis of rotation.

14. The seat arrangement according to claim 10, wherein a first distance between the first axis of rotation and the second axis of rotation corresponds to a second distance between the third axis of rotation and the fourth axis of rotation, and a third distance between the first axis of rotation and the third axis of rotation corresponds to a fourth distance between the second axis of rotation and the fourth axis of rotation.

15. The seat arrangement according to claim 10, wherein a first connecting line between the first axis of rotation and the second axis of rotation is parallel to a second connecting line between the third axis of rotation and the fourth axis of rotation, and a third connecting line between the first axis of rotation and the third axis of rotation is parallel to a fourth connecting line between the second axis of rotation and the fourth axis of rotation.

16. The seat arrangement according to claim 10, wherein a first armrest is provided, which is arranged laterally on the vehicle seat, the spring unit being arranged below the armrest as seen in a height direction.

* * * * *